United States Patent [19]

Schofield

[11] Patent Number: 5,587,972
[45] Date of Patent: Dec. 24, 1996

[54] CONTROL CIRCUIT USING DELAY LINES TO GENERATE CLOCK AND CONTROL SIGNALS DURING A CLOCK CYCLE OF THE SYSTEM CLOCK

[75] Inventor: Ronald D. Schofield, Ridgecrest, Calif.

[73] Assignee: The United States of America as represented by the Secretary of the Navy, Washington, D.C.

[21] Appl. No.: 610,502

[22] Filed: Mar. 4, 1996

[51] Int. Cl.$^6$ ................ G04F 8/00; G06F 1/04
[52] U.S. Cl. ............ 368/118; 368/120; 364/270; 395/557
[58] Field of Search .................. 368/113–120; 364/569; 395/350

[56] References Cited

U.S. PATENT DOCUMENTS

| | | | |
|---|---|---|---|
| 4,688,212 | 8/1987 | MacGinitie | 370/86.6 |
| 4,882,683 | 11/1989 | Rupp et al. | 395/165 |
| 5,212,723 | 5/1993 | Griesshaber | 380/11 |
| 5,390,304 | 2/1995 | Leach et al. | 395/375 |

Primary Examiner—Vit W. Miska
Attorney, Agent, or Firm—David S. Kalmbaugh; Melvin J. Sliwka; John L. Forrest, Jr.

[57] ABSTRACT

A control signal generator for generating a plurality of control and timing signals which are supplied to a scan converter. The control and timing signals are utilized by the logic elements of the scan converter to process the incoming pixel data from a missile's seeker allowing the data to be supplied to a video monitor for viewing. The control signal generator includes a state machine which generates four state variable signals and a cycle counter which generates a binary count thirty one signal which allows the state machine to cycle through six predetermined states until the scan converter completes processing of incoming pixel data from each detector of the missile's seeker. The count thirty one signal and the four state variable signals are decoded by five decoders which generate the timing and control signals for the logic elements of the scan converter. Some of the timing and control signals are delayed by five and fifteen nanosecond delay lines prior to being supplied to the logic elements of the scan converter.

20 Claims, 6 Drawing Sheets

CONTROL CIRCUIT USING DELAY LINES TO GENERATE CLOCK AND CONTROL SIGNALS DURING A CLOCK CYCLE OF THE SYSTEM CLOCK

BACKGROUND OF THE INVENTION

1. Field of the Invention

The present invention relates generally to digital circuitry for generating control signals to logic devices. In particular, the present invention relates to a control circuit using delay lines to generate clock and control signals during a clock cycle of the system clock.

2. Description of the Prior Art

Presently, a scan converter is used to convert a scanned image from missile seeker into a planner image for viewing on a video monitor. The conversion of the scanned image by the scan converter involves a process whereby each pixel of the image is weighted using algorithms selected by the user.

A weight is defined for each pixel in each sample which is the product of the weight for the number of overlapping samples and the weight which represents the percentage of the pixel covered by a detector for pixels near the edge of the detector. These weights are stored in a look-up table format in memory. As samples are taken, the weights are extracted from the look-up table and multiplied with a new pixel. Since different scan samples can overlap, the new pixel is summed with the previously scanned pixel to generate the final pixel value for a particular location.

The scan converter uses a plurality of logic elements including PROMs, a dual port RAM, a multiplier/accumulator and comparators to process the incoming pixel data. Each of the logic elements requires the generation of control and timing signal to perform its associated function.

Control circuits normally generate control and timing when the rising edge of the clock signal occurs. However, some of the control and timing signals for the scan converter require a delay after the rising edge of the clock pulse of the system clock signal. For the scan converter the system clock signal has a frequency of 50 megahertz with a period of 40 nanoseconds. A number of the control and timing signals for the logic elements of the scan converter require either a five nanosecond or a fifteen nanosecond delay from the rising edges of the 50 megahertz system clock signal. This, in turn, would normally require the use of a 200 megahertz clock signal generator with the scan converter to generate these five nanosecond or fifteen nanosecond delays for a number of the timing control signals used within the scan converter. However, it is desirable to generate these five nanosecond and fifteen nanosecond delays without adding an additional clock signal generator to the scan converter.

SUMMARY OF THE INVENTION

The present invention provides a means whereby a control circuit can provide control and timing or clock signals for a plurality of logic elements utilized in a scan converter. The control circuit of the present invention includes a state machine which is responsive to a fifty megahertz system clock signal generating four state variable signals. One or more of the four state variable signals are asserted during each state of the state machine, while the remaining state variable are not asserted except for a state IDLE during which the four state variables are not asserted.

The logic state of external control signals from the logic elements of the scan converter control branching of the state machine during processing of pixel data by the scan converter.

The control circuit also has a cycle counter. The cycle counter counts to a predetermined binary number or binary count of thirty one and is incremented by the state machine signal INCCYCLE(H). This predetermined binary number represents the number of times the state machine cycles through six states during which pixel data from each detector of the scan converter is processed.

The state variable signals from the state machine are supplied to five decoder circuits which decode the state variables as well as a count signal from the cycle counter. Four of the five decoder circuits also receive external control signals for decoding by each of the four decoder circuits.

The five decoder circuits, upon decoding the signals provided thereto, generate the control and clock signals for the logic elements of the scan converter. Some of the control and clock signals are then supplied to five or fifteen nanosecond delay circuits which delay the signals either five or fifteen nanoseconds from the rising edges of the 50 megahertz system clock signal. The delayed control and clock signals are then supplied to the logic elements of the scan converter allowing these logic elements to implement their respective functions.

DETAILED DESCRIPTION OF THE PREFERRED EMBODIMENT

Figure 1A:
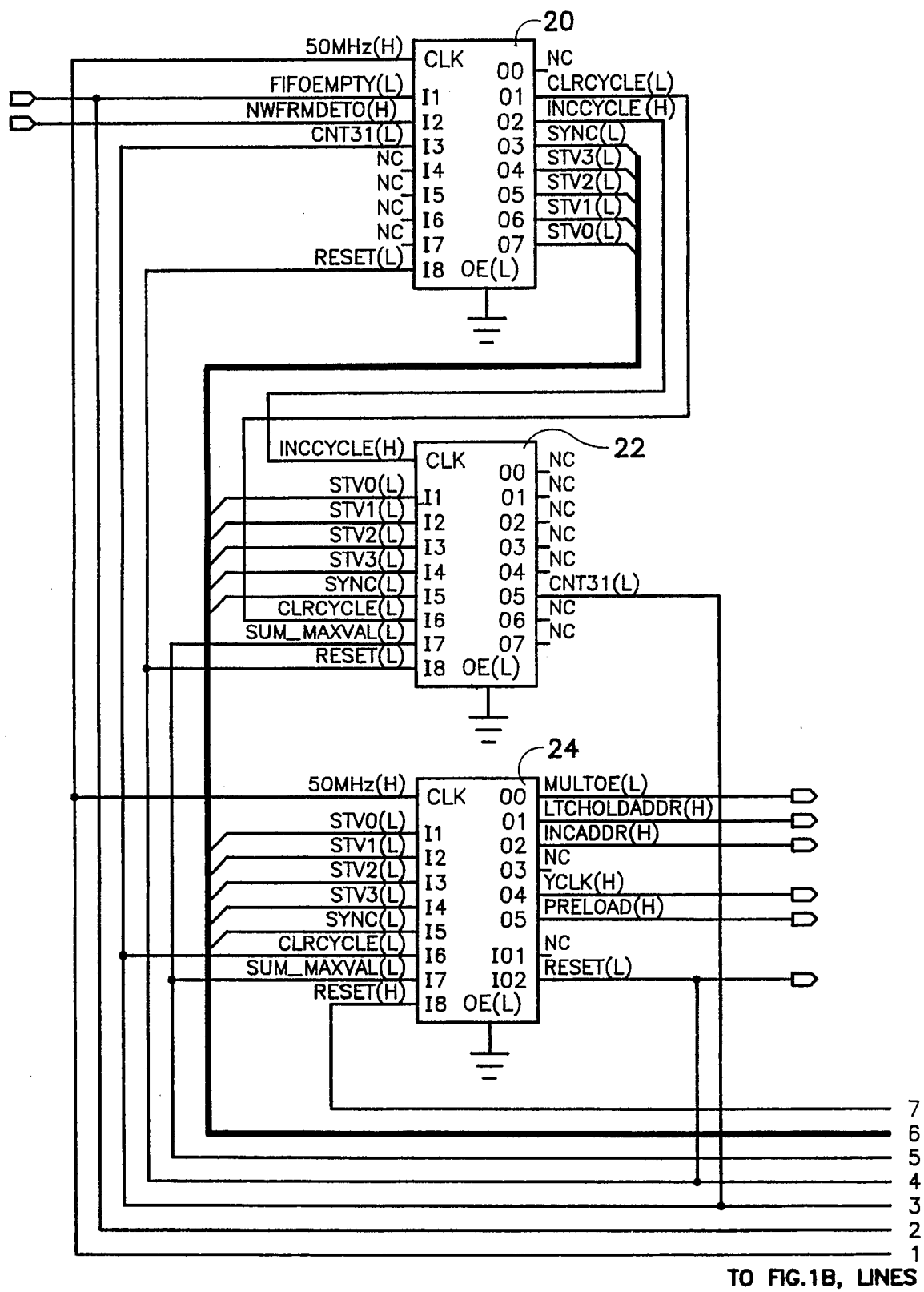
FIG. 1 is a detailed electrical schematic of the control circuit constituting the present invention.
Figure 1B:
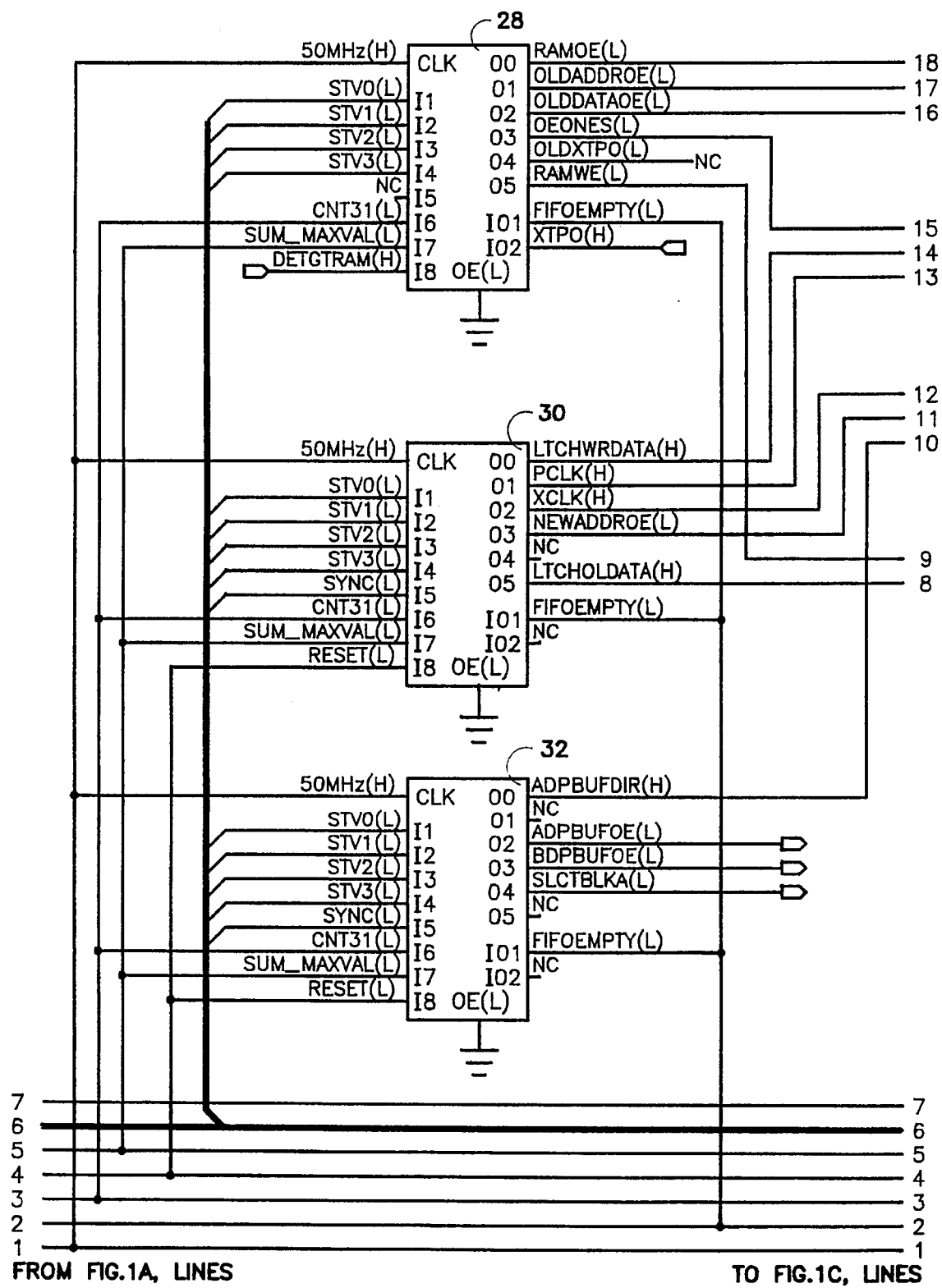
Figure 1C:
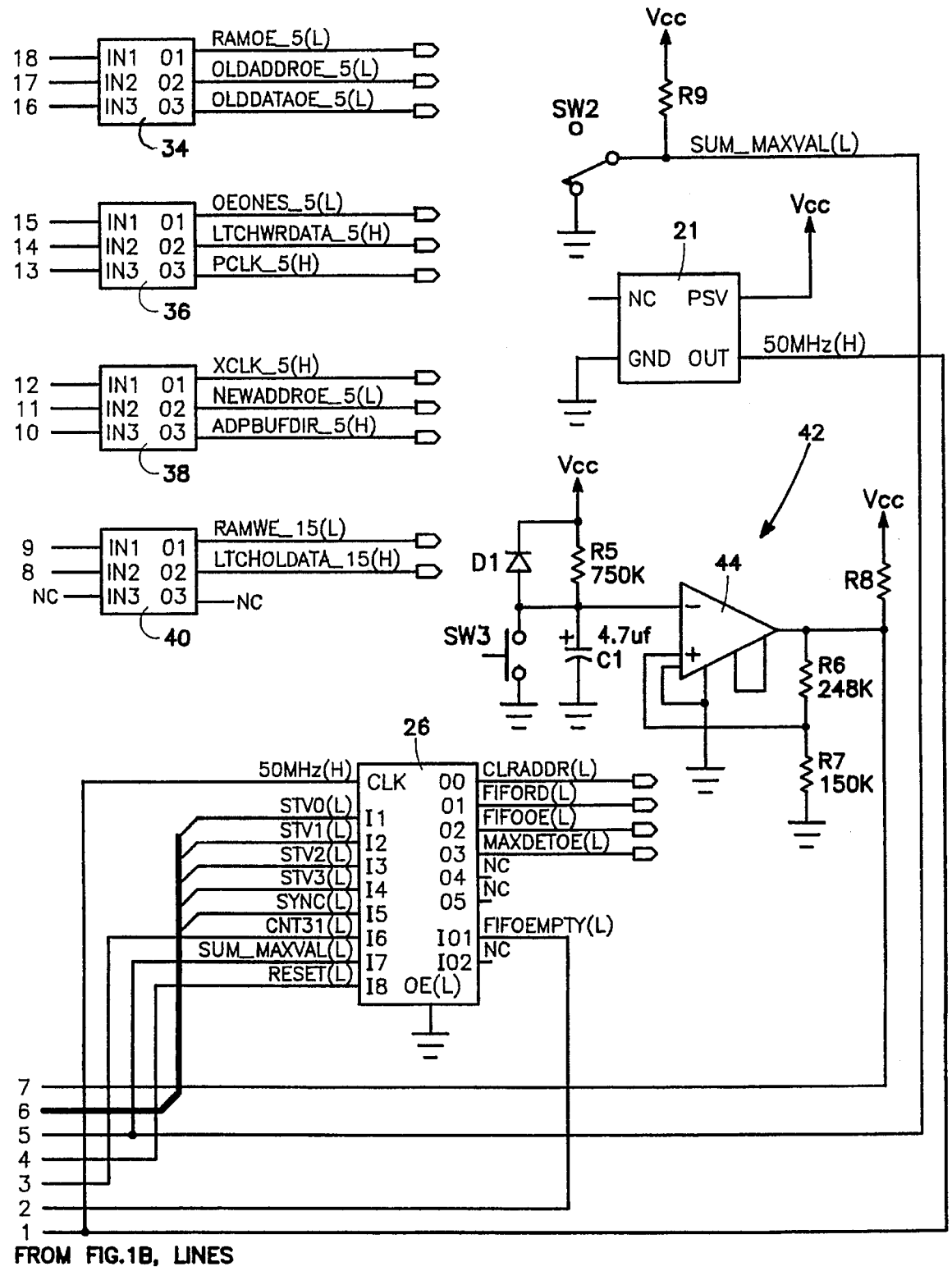
Figure 2:
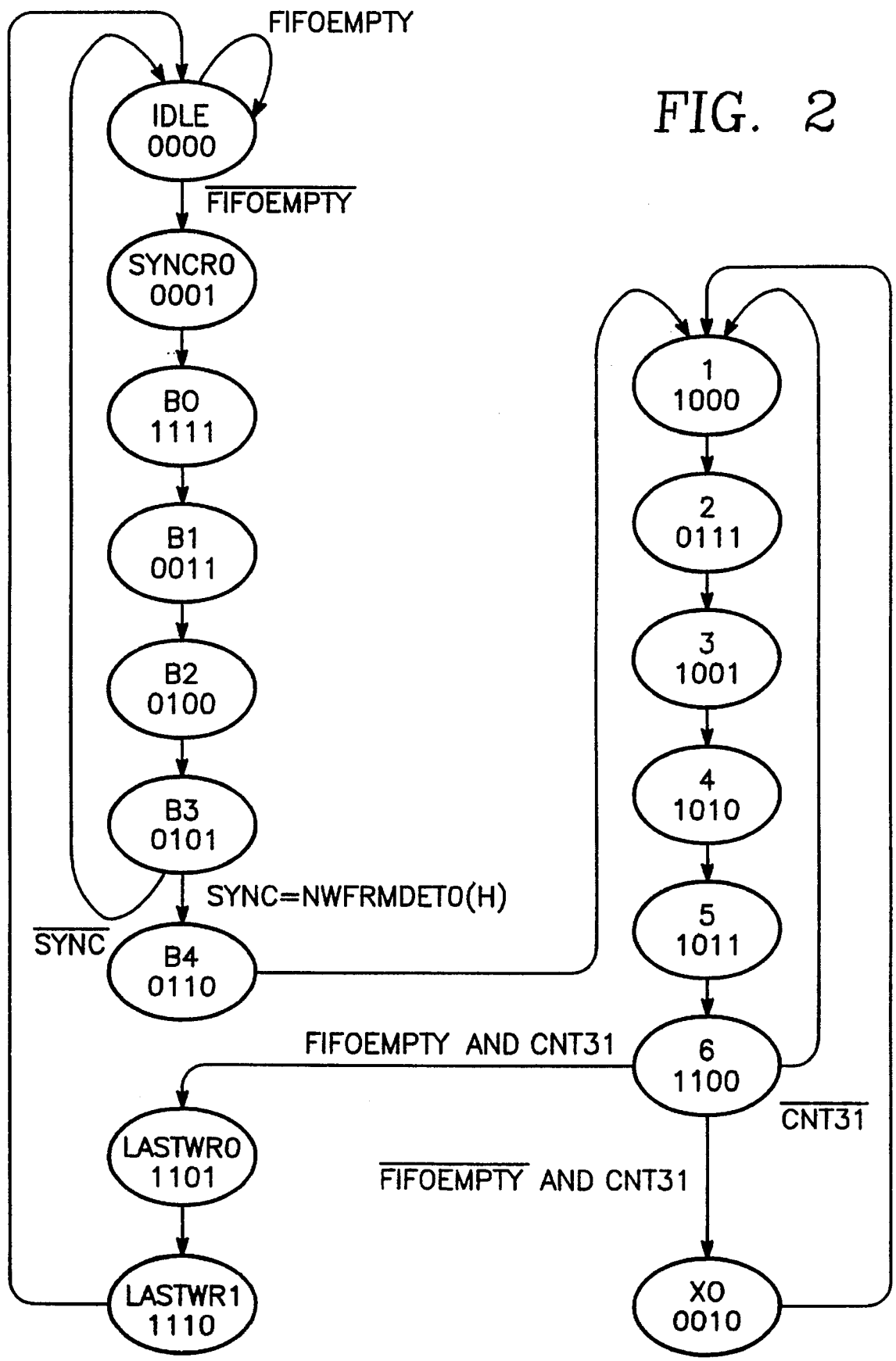
FIG. 2 is a state machine flow diagram for the state machine of FIG. 1.

Referring to FIGS. 1 and 2, the present invention comprises a state machine 20 which provides at its O7–O4 outputs respectively the state signals STV0, STV1, STV2 and STV3. Each of these state signals STV0, STV1, STV2 and STV3 is, in turn, asserted low, that is the signal is active at the logic zero state. A fifty megahertz clock signal is supplied to the CLK input of state machine 20 to clock the state machine through the various states illustrated in FIG. 2. The fifty megahertz clock signal is generated by a clock signal generator 21.

The state machine 20 is initially in state IDLE with its STV0, STV1, STV2 and STV3 state signals being respectively 0, 0, 0, 0. A one in each state of FIG. 2 indicates that the state signal is asserted and a zero indicates that the state signal is not asserted. For state machine 20 the program listing is set forth in the Module SM FLAG '–r0' of Appendix A.

In the program listing of Appendix A, each input signal or output signal is followed by an H or L in parenthesis. When the input signal or output signal is followed by an L in parenthesis the signal is asserted low. For example, STV0(L) indicates that the signal occurring at the O7 output of state machine 20 is asserted low. In a like manner, when the input signal or output signal is followed by an H in parenthesis the signal is asserted high. For example, the fifty megahertz clock signal (CLK50MHZ(H)) is asserted high, that is a zero to one transition of the fifty megahertz clock signal will clock state machine from one state to its next state. The counter thirty one signal (CNT31(L)) and the FIFOEMPTY(L) signal are also asserted low.

In the program listing of Appendix A, the "!" character indicates that the signal is not asserted, the "#" character indicates an "OR" function and the "&" character indicates an "AND" function.

For state machine 20 each of the outputs is defined by a logic equation which is set forth in Module SM FLAG '–r0' of Appendix A. For example, the output signal SYNC(L) which is asserted low is equal to the input signal NWFRMDET0(H) which is asserted high. The NWFRMDET0(H) (new frame detected) signal is an external bit in an incoming data stream which indicates the beginning of a frame of data.

In a like manner, the output signal CLRCYCLE(L) which is asserted low is equal to not A (STV0 is high) and not B (STV1 is high) and not C (STV2 is high) and not D (STV3 is high) or A (STV0 is low) and not B (STV1 is high) and not C (STV2 is high) and not D (STV3 is high). The CLRCYCLE(L) signal is supplied to the I6 input of a cycle counter 22 clearing the cycle counter which tracts the number of pixels processed for each external detector.

State machine 20 also generates an INCCYCLE(H) which is asserted high. This signal increments cycle counter 22 to indicate the number of pixels processed for each external detector with 32 pixels being processed per detector. The program listing for cycle counter 22 is set forth in the Module CYC FLAG '–r0' of Appendix A.

As is best illustrated in FIG. 2, state machine 20 is initially in state IDLE and will remain in state IDLE as long the FIFOEMPTY(L) signal is asserted, that is the FIFOEMPTY signal is low. When the FIFOEMPTY(L) signal is de-asserted which indicates that an external FIFO has pixel data to be processed, the fifty megahertz clock signal clocks state machine 20 from state IDLE through states SYNCHRO, B0, B1, B2 to state B3. If the NWFRMDET0(H) signal at the I2 input of state machine 20 is low than state machine returns to state IDLE. When the NWFRMDET0 bit (sync bit) is asserted at a logic one, the fifty megahertz clock signal clocks the state machine through state B4 to state 1. The NWFRMDET0 bit is the first bit from the first detector at the beginning of a scan of a missile seeker.

The state machine 20 will now cycle through state 1, state 2, state 3, state 4, state 5 and state 6 as long the CNT31(L) signal from cycle counter 22 is not asserted, that is the CNT31(L) signal supplied to state machine 22 is held high. While state machine is cycling through states 1, 2, 3, 4, 5 and 6, an external multiplier/accumulator is processing the 32 pixels of detector data from the first detector. State machine 20 will cycle through states 1–6 thirty two times until the CNT31(L) signal is asserted by cycle counter. It should be noted that cycle counter 22 counts from zero to thirty one.

When state machine 20 is cycling through states 1–6 each of the state variables STV0–STV3 are asserted or not asserted depending on the state of state machine 20. For example, in state 1 the state variable STV3 state machine 20 is asserted, that is the STV3 output signal is low and the STV2, STV1 and STV0 state variables of state machine 20 are not asserted. The fifty megahertz clock signal clocks the state variables to the O7–O4 outputs of state machine 20.

Similarly, in state 2 the STV2, STV1 and STV0 state variables of state machine 20 are asserted, that is the STV2, STV1 and STV0 state variables of state machine 20 are low and the STV3 state variable is not asserted. The fifty megahertz clock signal clocks the state variables to the O7–O4 outputs of state machine 20.

The STV0–STV3 state signals are supplied to decoders 24, 26, 28, 30 and 32, which decode the signals in accordance with the logic equations set forth in Appendix A. Decoder 28, for example, provides at its O0 output a RAMOE(L) signal which is asserted low. Referring to Module U38OUT FLAG '–r0' of Appendix A, the logic equation for RAMOE (RAM output enable) is:

$$RAMOE(L) := \\ STB4\#ST6\&CNT31(L)\&!FIFOEMPTY(L)\#STX0\#ST5\# \\ ST6\&!CNT31(L) \quad (1)$$

STB4 of logic equation (1) is defined by the following logic equation:

$$STB4 =!D\&C\&B\&!A \quad (2)$$

where D is STV3 (L), C is STV2 (L), B is STV1(L) and A is STV0 (L).

When state machine 20 is in state B4 the conditions for STB4 are satisfied since B and C are asserted and D and A are not asserted. This results in decoder 28 generating a RAMOE signal when state machine 20 transitions to state B5.

Similarly, STX0 of logic equation (1) is defined by the following expression:

$$STX0 =!D\&!C\&B\&!A \quad (3)$$

When state machine 20 is in state X0 the conditions for STX0 are satisfied since only B is asserted and A, B and D are not asserted. This results in decoder 28 generating a RAMOE signal when state machine 20 transitions to state 1.

The RAMOE(L) signal from decoder 28 is supplied to the IN1 input of a delay line 34 which delays the signal by five nanoseconds resulting in a RAMOE_5(L) signal occurring at the O1 output of delay line 34. This RAMOE_5(L) signal, which is asserted low, is then supplied to an external RAM (not illustrated) enabling RAM data onto a data bus (not illustrated).

Decoder 28 generates at its O5 output a RAMWE(L) signal which is asserted low. Referring to Module U38OUT FLAG '–r0' of Appendix A, the logic equation for RAMWE(L) (RAM write enable) is:

$$RAMWE(L) := \quad (4)$$
$$ST1\ \&\ !MAXVALUE(L)\ \#\ ST6\ \%\ FIFOEMPTY(L)\ \&\ CNT31(L)\ \&$$
$$!MAXVALUE(L)\ \#\ ST3\ \%\ DETGTRAM(H)\ \&\ MAXVALUE(L);$$

RAMWE(L) is asserted when state machine 20 is at state 1 and the MAXVALUE(L) signal, which is supplied to the I7 input of decoder 28, is not asserted, i.e. the MAXVALUE(L) signal is high or logic one. When state machine 20 transitions to state 2, the O5 output of decoder 28 will transition low or logic zero.

The RAMWE(L) signal from decoder 28 is supplied to the IN1 input of a delay line 40 which delays the signal by fifteen nanoseconds resulting in a RAMOE_15(L) signal occurring at the O1 output of delay line 40. This RAMOE_15(L) signal, which is asserted low, is then supplied to the external RAM executing the write to the external RAM.

The MAXVALUE(L) signal is an input signal from a user selected switch SW2 which sets the mode of operation from placing a summation of incoming detectors into display memory to comparing incoming detector data with the value already in memory and then placing the largest value back into memory. Thus, after processing of the incoming data the maximum detector value is left for display. The DETGTRAM signal, which is asserted high, is a signal from an external comparator (not illustrated) which indicates that the maximum value of incoming detector pixel data is greater than the value in RAM from a previous detector.

At this time it should be noted that state machine 20 and cycle counter 22 are each Model TIBPAL16R8 Programmable Array Logic Circuits and decoders 24, 26, 28, 30 and 32 are each Model TIBPAL16R6 Programmable Array Logic Circuits commercially available from Texas Instruments of Dallas, Tex. As is best illustrated in the module of Appendix A for each Programmable Array Logic Circuit, the module for each Programmable Array Logic Circuit includes test vectors which allow the designer to test the operation of the Programmable Array Logic Circuit. The test vectors allow the designer to enter the state transitions in the test vector that are the expected result. If there is failure, that is the expected results do not occur, than the logic equations are in error and need to be rewritten.

It should also be noted that delay lines 34, 36 and 38 are Model MDU-3F-5 Active Delay Lines commercially available from Data Delay Devices Inc. of Clifton, N.J., Jersey, while delay line 40 is a Model MDU-3F-15 Active Delay Lines also commercially available from Data Delay Devices Inc.

As shown in FIG. 2, when state machine 20 is at state 6 a branch condition occurs. This branch condition is dependent upon the logic states of the input signals CNT31(L) and FIFOEMPTY(L) which are respectively supplied to the I1 and I3 inputs of state machine 20. When the CNT31(L) signal is not asserted, that is CNT31(L) is high, state machine loops to state 1.

When the CNT31(L) signal is asserted and the FIFOEMPTY(L) signal is not asserted, state machine 20 branches to state X0. Whenever state machine 20 branches to state X0 pixel data from a new detector will be processed.

When the CNT31(L) signal is asserted and the FIFOEMPTY(L) signal is asserted (indicating that the FIFO is empty of pixel data), state machine 20 branches to state LASTWR0 proceeding through state LASTWR1 and returning to state IDLE. During states LASTWR0 and LASTWR1, the last pixel of data processed by the multiplier accumulator is written into external memory.

After returning to state IDLE, state machine 20 remains in state IDLE until the FIFOEMPTY(L) signal is de-asserted indicating the presence of pixel data to be processed from a subsequent scan of the missile's seeker.

It should be noted that the FIFOEMPTY(L) signal is asynchronous with respect to the 50 megahertz system clock signal when the state machine 20 is at state IDLE. When state machine 20 is at state SYNCRO the FIFOEMPTY(L) signal is synchronized to the 50 megahertz system clock signal. Between state IDLE and state SYNCRO only the state signal STV0 is varied as shown in FIG. 2.

Decoder 32 generates at its O2 output a ADPBUFOE(L) signal and at its O3 output a BDPBUFOE(L) signal with each signal being asserted low. The ADPBUFOE(L) signal enables the output buffer for the A bank of memory of the RAM and the BDPBUFOE(L) signal enables the output buffer for the B bank of memory of the RAM.

Figure 3:
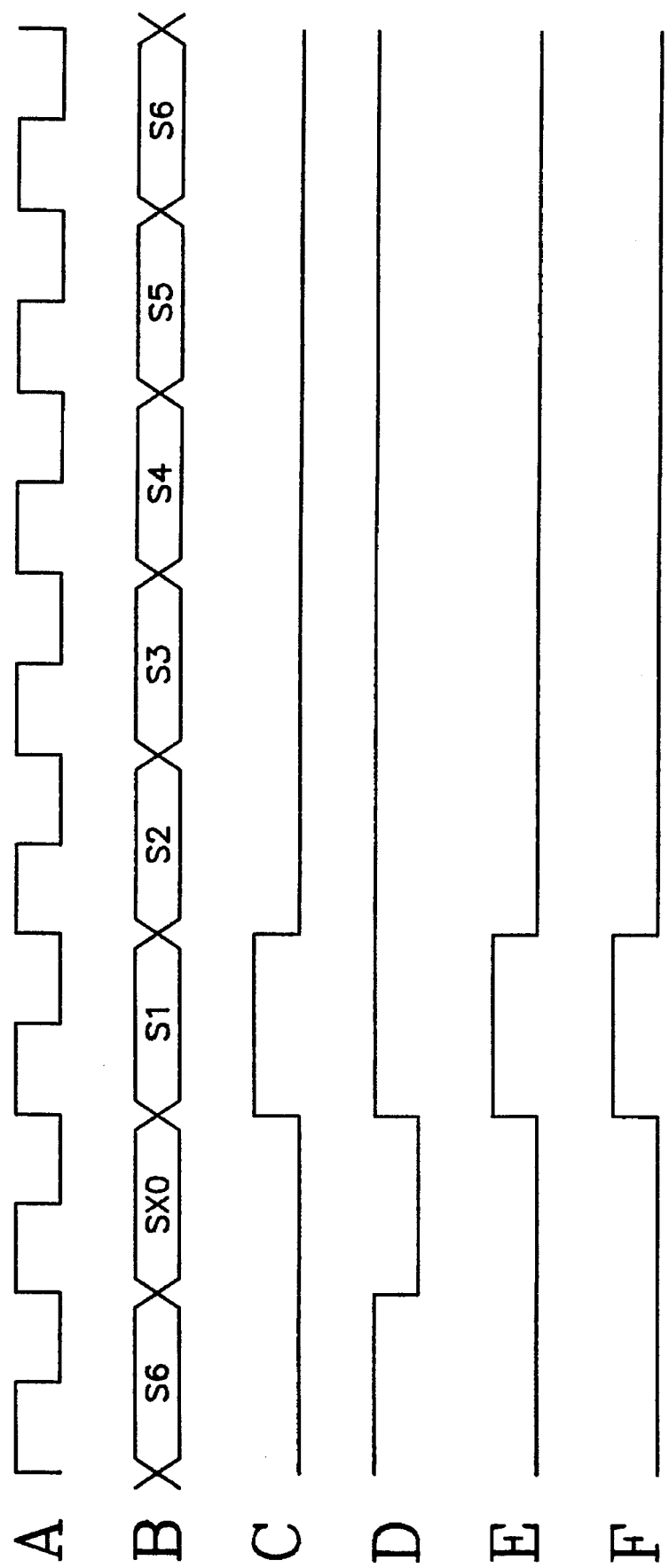
FIGS. 3A–3F is a timing diagram illustrating control and timing signals occurring at the outputs of a number of the logic elements of FIG. 1.

Referring now to FIGS. 1, 2 and 3A–3F, the fifty megahertz clock signal (FIG. 3A) is supplied to the CLK input of state machine 20 to clock the state machine through the various states illustrated in FIG. 3B.

The logic equation for the FIFORD(L) signal of FIG. 3C is defined by the following expression:

$$FIFORD(L) := STB3 \ \& \quad (5)$$

$$SYNC(L) \ \& \ !RESET(L) \ \# \ STB4 \ \& \ MAXVALUE(L) \ \&$$

$$!RESET(L) \ \# \ ST4 \ \& \ !MAXVALUE(L) \ \& \ !RESET(L) \ \# \ STX0 \ \&$$

$$MAXVALUE(L) \ \& \ !RESET(L) \ \# \ A \ \& \ !C \ \& \ !RESET(L) \ \# \ A \ \&$$

$$B \ \& \ !RESET(L) \ \# \ !A \ \& \ !B \ \& \ D \ \&$$

$$!RESET(L) \ \# \ !A \ \& \ !B \ \& \ C \ \& \ !RESET(L);$$

Whenever state machine 20 is at state X0 and MAXVALUE(L) is not asserted the conditions for FIFORD(L) are not satisfied which results in decoder 26 decoding FIFORD(L) to a high state. As shown in FIG. 3C the fifty megahertz clock signal of FIG. 3A will clock this high to the O1 output of decoder 26 when state machine 20 transitions to state 1.

The FIFOOE(L) signal of FIG. 3D is low only when state machine 20 transitions to state X0. As shown by the logic expression for FIFOOE(L) in Module U42OUT FLAG '–r0' of Appendix A, FIFOOE(L) is asserted whenever state machine 20 is in state 6, the CNT31(L) signal from cycle counter 22 is asserted and the FIFOEMPTY(L) signal is not asserted. The fifty megahertz clock signal of FIG. 3A will clock this low or logic zero to the O2 output of decoder 26 when state machine 20 transitions to state X0.

The YCLK(H) signal of FIG. 3E transitions from low to high when state machine 20 transitions to state 1. The YCLK(H) signal of FIG. 3E is asserted high, that is a zero to one transition of the YCLK(H) signal of FIG. 3E will clock data into the Y register of the external multiplier/accumulator. The logic equation for the YCLK(H) signal of FIG. 3E is defined by the following expression:

$$!Y \ CLK \ (H) := A \# !B \# D \# MAXVALUE(L); \quad (6)$$

During state X0, A is not asserted, B is asserted, D is not asserted and MAXVALUE(L) is not asserted. This results in a high at the O4 output of decoder 24 when the fifty megahertz clock signal of FIG. 3A clock this high to the O4 output of decoder 24 at the transition of state machine 20 to state 1.

It should be noted that the output signals provided by state machine 20, cycle counter 22 and decoders 24, 26, 28, 30 and 32 are asserted low since there is an inverter at each output O0-O7 of the programmable array logic devices used to implement state machine 20, cycle counter 22 and decoders 24, 26, 28, 30 and 32.

The signal of FIG. 3F is the INCCYCLE(H) signal provided at the O2 output of state machine 20.

Figure 4:
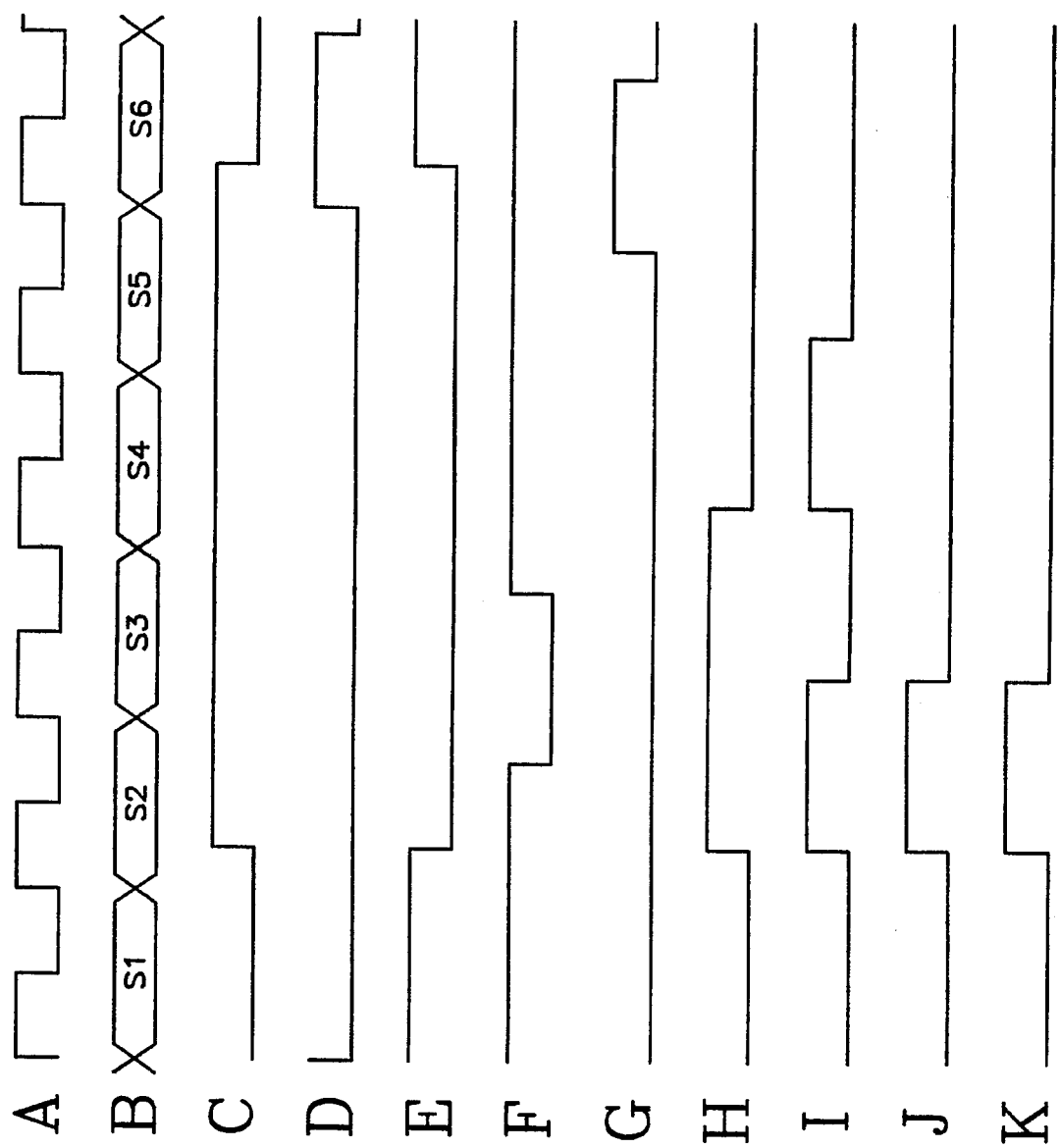
FIGS. 4A–4K is a second timing diagram illustrating control and timing signals occurring at the outputs of a number of the logic elements of FIG. 1.

Referring now to FIGS. 1, 2 and 4A–4K, the fifty megahertz clock signal (FIG. 4A) is supplied to the CLK input of state machine 20 to clock the state machine through the various states illustrated in FIG. 4B. When state machine 20 is in state 5 the conditions for logic expression (1) are satisfied which results in the fifty megahertz clock signal of FIG. 4A clocking a low or logic zero to the O0 output of decoder 28. This logic zero is then supplied to delay line 34 which delays the signal by five nanoseconds resulting in a logic one to zero transition of the RAMOE(L) signal of FIG. 4C. The RAMOE(L) signal of FIG. 4C will transition from a logic zero to a logic one five nanoseconds after state machine transitions to state 2 since delay line 34 delays the signal transition by five nanoseconds after it is clocked to the O0 output of decoder 28 by the fifty megahertz clock signal of FIG. 4C.

The timing waveform for the ADPBUFOE(L) signal and the BDPBUFOE(L) signal is illustrated in FIG. 4D. Both signals transition on the rising edge of a clock pulse since the signals are not delayed by a delay line. The timing waveform for the ADPBUFDIR(H) signal is illustrated in FIG. 4E. This signal which is supplied to the external RAM selects direction for its data buffers and requires a five nanosecond delay. As is best illustrated in FIG. 4E, a zero to one transition of the ADPBUFDIR(H) signal of FIG. 4E occurs five nanoseconds after state machine 20 transitions to state 6. The five nanosecond delay in the ADPBUFDIR(H) signal of FIG. 4E is provided by delay line 38.

Similarly, the RAMWE(L) signal of FIG. 4F is delayed by fifteen nanoseconds when the signal is asserted low. The fifteen nanosecond delay in the RAMWE(L) signal of FIG. 4F is provided by delay line 40.

As is best illustrated in FIG. 4G, delay line 40 delays the LTCHOLDDATA(H) signal by fifteen nanoseconds after the signal is clocked to the O5 output of decoder 30 by the fifty megahertz clock signal of FIG. 4A. The LTCHOLDATA(H) signal of FIG. 4A is a latch old data into a holding register.

The OEONES(L) signal is delayed by five nanoseconds by delay line 36 as is best illustrated in FIG. 4H. This signal enables all ones onto the internal data bus for writing the data into memory.

The PCLK(H) signal of FIG. 4I is delayed five nanoseconds by delay line 36, while the XCLK(H) signal of FIG. 4J is also delayed by five nanoseconds by delay line 38. The PCLK(H) signal is a clock signal supplied to the multiplier/accumulator to load its X register. The XCLK(H) signal of FIG. 4J is a clock signal supplied to the multiplier/accumulator to load its Y register.

The LTCHWRDDATA(H) of FIG. 4K is delayed by five nanoseconds by delay line 36. The LTCHWRDDATA(H) of FIG. 4K is used to latch write data into external comparators in the maximum value mode of operation.

Referring to FIG. 1, there is shown a reset signal generating circuit 42 for generating a RESET(H) signal which is asserted high. This signal is supplied to the I8 input of decoder 24 which inverts the signal resulting in a RESET(L) signal at the IO2 output of decoder 24. The RESET(L) signal is supplied to state machine 20, cycle counter 22 and decoders 30, 32 and 34 resetting state machine 20, cycle counter 22 and decoders 30, 32 and 34. The RESET(H) signal is generated when an operator closes switch SW3 discharging capacitor C1 which results in a logic signal of approximately +5 VDC at the output of comparator 44.

Obviously, many modifications and variations of the present invention are possible in light of the above teachings. It is therefore to be understood that within the scope of the appended claims the invention may be practiced otherwise than as specifically described.

Navy Case No. 73852

Appendix A

```
MODULE SM FLAG '-r0'
TITLE 'TIGER SCAN CONVERTER state machine pal
7-15-91; 10-16-91 fix assertion of SYNC
Schofield  NWC  CHINA LAKE, CA.'

U45    device    'P16R8';

CLK50MHZ(H)     pin    1;
        FIFOEMPTY(L)    pin    2;
        NWFRMDET0(H)    pin    3;
        CNT31(L)        pin    4;
        RESET(L)        pin    9;

STV0(L)         pin    19;
        STV1(L)         pin    18;
        STV2(L)         pin    17;
        STV3(L)         pin    16;

SYNC(L)         pin    15;
        INCCYCLE(H)     pin    14;
        CLRCYCLE(L)     pin    13;

CLK      =     .C.;

A = STV0(L);
B = STV1(L);
C = STV2(L);
D = STV3(L);

EQUATIONS

SYNC(L) := NWFRMDET0(H);

!INCCYCLE(H) := B
        # C & !D
        # A & D
        # !A & !C;"SYNC OR ST6 DEMORGANED

CLRCYCLE(L) := !A & !B & !C & !D
             # A & !B & !C & !D;"IDLE OR SYNC

STV0(L) := !A & !B & !C & !D & !FIFOEMPTY(L) & !RESET(L)
        # !A & !B & C & D & FIFOEMPTY(L) & CNT31(L) & !RESET(L)
        # A & !B & !C & !D & !RESET(L)
        # !A & !B & C & !D & !RESET(L)
        # !A & !C & D & !RESET(L)
        # A & B & C & !RESET(L);

STV1(L):=!A & !B & C & D & !FIFOEMPTY(L) & CNT31(L) & !RESET(L)
        # A & !B & C & !D & NWFRMDET0(H) & !RESET(L)
        # !A & !C & D & !RESET(L)
        # A & !B & !C & !RESET(L)
        # A & C & D & !RESET(L);
```

```
        STV2(L)  :=!A &  !B &  C &  D &  FIFOEMPTY(L) &  CNT31(L)& !RESET(L)
                # A &  !B &  C & !D &  NWFRMDET0(H) &  !RESET(L)
                # !A &  !B &  !C &  D &  !RESET(L)
                # A &  !B &  C &  D &  !RESET(L)
                # !A &  !B &  C &  !D &  !RESET(L)
                # A &  !C &  !D &  !RESET(L)
                # A &  B &  !C &  !RESET(L);

STV3(L)  :=!A &  !B &  C &  D &  FIFOEMPTY(L) &  CNT31(L)& !RESET(L)
                # !A &  !B &  C &  D &  !CNT31(L)& !RESET(L)
                # B &  C &  !D &  !RESET(L)
                # !A &  B &  !C &  !RESET(L)
                # B &  !C &  D &  !RESET(L)
                # A &  !B &  !C &  !RESET(L)
                # A &  !B &  D &  !RESET(L);

TEST_VECTORS ([NWFRMDET0(H),CLK50MHZ(H)]  ->   [SYNC(L) ])

[0,CLK] -> [0];
            [1,CLK] -> [1];
            [1,CLK] -> [1];
            [0,CLK] -> [0];
            [0,CLK] -> [0];

TEST_VECTORS
    ([CLK50MHZ(H),FIFOEMPTY(L),NWFRMDET0(H),CNT31(L),RESET(L)]  ->
      [STV3(L),STV2(L),STV1(L),STV0(L),   INCCYCLE(H),CLRCYCLE(L) ])

[CLK,1,0,0,1] -> [0,0,0,0, 0,1];"1
            [CLK,1,0,0,0] -> [0,0,0,0, 0,1];
            [CLK,0,0,0,0] -> [0,0,0,1, 0,1];
            [CLK,0,0,0,0] -> [1,1,1,1, 1,1];
            [CLK,0,0,0,0] -> [0,0,1,1, 0,0];
            [CLK,0,0,0,0] -> [0,1,0,0, 0,0];
            [CLK,0,0,0,0] -> [0,1,0,1, 0,0];
            [CLK,0,0,0,0] -> [0,0,0,0, 0,0];"8

[CLK,1,0,0,0] -> [0,0,0,0, 0,1];
            [CLK,0,0,0,0] -> [0,0,0,1, 0,1];
            [CLK,0,0,0,0] -> [1,1,1,1, 1,1];
            [CLK,0,0,0,0] -> [0,0,1,1, 0,0];
            [CLK,0,0,0,0] -> [0,1,0,0, 0,0];
            [CLK,0,0,0,0] -> [0,1,0,1, 0,0];"15

[CLK,0,1,0,0] -> [0,1,1,0, 0,0];"SYNC
            [CLK,0,0,0,0] -> [1,0,0,0, 0,0];
            [CLK,0,0,0,0] -> [0,1,1,1, 0,0];
            [CLK,0,0,0,0] -> [1,0,0,1, 0,0];
            [CLK,0,0,0,0] -> [1,0,1,0, 0,0];
            [CLK,0,0,0,0] -> [1,0,1,1, 0,0];
            [CLK,0,0,0,0] -> [1,1,0,0, 0,0];"22

[CLK,0,0,0,0] -> [1,0,0,0, 1,0];"NOT CNT31
            [CLK,0,0,0,0] -> [0,1,1,1, 0,0];
            [CLK,0,0,0,0] -> [1,0,0,1, 0,0];
```

```
            [CLK,0,0,0,0] -> [1,0,1,0, 0,0];
            [CLK,0,0,0,0] -> [1,0,1,1, 0,0];
            [CLK,0,0,0,0] -> [1,1,0,0, 0,0];"28

[CLK,0,0,1,0] -> [0,0,1,0, 1,0];"CNT31 AND NOT
  FIFOEMPTY
            [CLK,0,0,0,0] -> [1,0,0,0, 0,0];
            [CLK,0,0,0,0] -> [0,1,1,1, 0,0];
            [CLK,0,0,0,0] -> [1,0,0,1, 0,0];
            [CLK,0,0,0,0] -> [1,0,1,0, 0,0];
            [CLK,0,0,0,0] -> [1,0,1,1, 0,0];

[CLK,0,0,0,0] -> [1,1,0,0, 0,0];
            [CLK,1,0,1,0] -> [1,1,0,1, 1,0];"CNT31 AND FIFOEMPTY
            [CLK,0,0,0,1] -> [0,0,0,0, 0,0];
            [CLK,0,0,0,1] -> [0,0,0,0, 0,1];
            [CLK,0,0,0,1] -> [0,0,0,0, 0,1];
  END SM
```

```
MODULE CYC  FLAG '-r0'
TITLE 'TIGER SCAN CONVERTER Cycle counter pal
7-17-91
Schofield  NWC  CHINA LAKE, CA.'

U46      device    'P16R8';

INCCYCLE(H)    pin    1;
    STV0(L)        pin    2;
    STV1(L)        pin    3;
    STV2(L)        pin    4;
    STV3(L)        pin    5;
    SYNC(L)        pin    6;
    CLRCYCLE(L)    pin    7;
    SUM_MAXVAL(L)  pin    8;
    RESET(L)       pin    9;

CNT0(L)        pin   12;
    CNT1(L)        pin   13;
    CNT2(L)        pin   14;
    CNT3(L)        pin   15;
    CNT4(L)        pin   16;
    CNT31(L)       pin   17;

CLK      =    .C.;

A = STV0(L);
B = STV1(L);
C = STV2(L);
D = STV3(L);

EQUATIONS

CNT31(L) := !CNT0(L) & CNT1(L) & CNT2(L) & CNT3(L) & CNT4(L)
            & !CLRCYCLE(L) & !RESET(L);

CNT0(L) := !CNT0(L) & !CLRCYCLE(L) & !RESET(L);

CNT1(L) := CNT0(L) & !CNT1(L) & !CLRCYCLE(L) & !RESET(L)
         # !CNT0(L) & CNT1(L) & !CLRCYCLE(L) & !RESET(L);

CNT2(L) := CNT0(L) & CNT1(L) & !CNT2(L) & !CLRCYCLE(L) & !RESET(L)
         # !CNT0(L) & CNT2(L) & !CLRCYCLE(L) & !RESET(L)
         # !CNT1(L) & CNT2(L) & !CLRCYCLE(L) & !RESET(L);

CNT3(L) := CNT0(L) & CNT1(L) & CNT2(L) & !CNT3(L) & !CLRCYCLE(L)
         & !RESET(L)
         # !CNT0(L) & CNT3(L) & !CLRCYCLE(L) & !RESET(L)
         # !CNT1(L) & CNT3(L) & !CLRCYCLE(L) & !RESET(L)
         # !CNT2(L) & CNT3(L) & !CLRCYCLE(L) & !RESET(L);

CNT4(L) := CNT0(L) & CNT1(L) & CNT2(L) & CNT3(L) & !CNT4(L) &
           !CLRCYCLE(L) & !RESET(L)
         # !CNT0(L) & CNT4(L) & !CLRCYCLE(L) & !RESET(L)
         # !CNT1(L) & CNT4(L) & !CLRCYCLE(L) & !RESET(L)
```

```
        # !CNT2(L) & CNT4(L) & !CLRCYCLE(L) & !RESET(L)
        # !CNT3(L) & CNT4(L) & !CLRCYCLE(L) & !RESET(L);

TEST_VECTORS ([STV3(L), STV2(L), STV1(L), STV0(L), CLRCYCLE(L),
INCCYCLE(H), RESET(L) ]   ->
    [CNT0(L), CNT1(L), CNT2(L), CNT3(L), CNT4(L), CNT31(L) ])

[0,0,0,0,0,CLK,1] -> [0,0,0,0,0,0];

[1,0,0,0,1,CLK,0] -> [0,0,0,0,0,0];

[1,0,0,0,0,CLK,0] -> [1,0,0,0,0,0];
        [1,0,0,0,0,CLK,0] -> [0,1,0,0,0,0];
        [1,0,0,0,0,CLK,0] -> [1,1,0,0,0,0];
        [1,0,0,0,0,CLK,0] -> [0,0,1,0,0,0];
        [1,0,0,0,0,CLK,0] -> [1,0,1,0,0,0];
        [1,0,0,0,0,CLK,0] -> [0,1,1,0,0,0];
        [1,0,0,0,0,CLK,0] -> [1,1,1,0,0,0];

[1,0,0,0,0,CLK,0] -> [0,0,0,1,0,0];"10
        [1,0,0,0,0,CLK,0] -> [1,0,0,1,0,0];
        [1,0,0,0,0,CLK,0] -> [0,1,0,1,0,0];
        [1,0,0,0,0,CLK,0] -> [1,1,0,1,0,0];
        [1,0,0,0,0,CLK,0] -> [0,0,1,1,0,0];
        [1,0,0,0,0,CLK,0] -> [1,0,1,1,0,0];
        [1,0,0,0,0,CLK,0] -> [0,1,1,1,0,0];
        [1,0,0,0,0,CLK,0] -> [1,1,1,1,0,0];

[1,0,0,0,0,CLK,0] -> [0,0,0,0,1,0];
        [1,0,0,0,0,CLK,0] -> [1,0,0,0,1,0];
        [1,0,0,0,0,CLK,0] -> [0,1,0,0,1,0];"20
        [1,0,0,0,0,CLK,0] -> [1,1,0,0,1,0];
        [1,0,0,0,0,CLK,0] -> [0,0,1,0,1,0];
        [1,0,0,0,0,CLK,0] -> [1,0,1,0,1,0];
        [1,0,0,0,0,CLK,0] -> [0,1,1,0,1,0];
        [1,0,0,0,0,CLK,0] -> [1,1,1,0,1,0];

[1,0,0,0,0,CLK,0] -> [0,0,0,1,1,0];
        [1,0,0,0,0,CLK,0] -> [1,0,0,1,1,0];
        [1,0,0,0,0,CLK,0] -> [0,1,0,1,1,0];
        [1,0,0,0,0,CLK,0] -> [1,1,0,1,1,0];
        [1,0,0,0,0,CLK,0] -> [0,0,1,1,1,0];"30
        [1,0,0,0,0,CLK,0] -> [1,0,1,1,1,0];
        [1,0,0,0,0,CLK,0] -> [0,1,1,1,1,0];
        [1,0,0,0,0,CLK,0] -> [1,1,1,1,1,1];

[1,0,0,0,0,0  ,0] -> [1,1,1,1,1,1];
        [1,0,0,0,0,0  ,0] -> [1,1,1,1,1,1];

[1,0,0,0,0,CLK,0] -> [0,0,0,0,0,0];
        [1,0,0,0,0,CLK,0] -> [1,0,0,0,0,0];
        [1,0,0,0,0,CLK,0] -> [0,1,0,0,0,0];
        [1,0,0,0,0,CLK,0] -> [1,1,0,0,0,0];
        [1,0,0,0,0,CLK,0] -> [0,0,1,0,0,0];
        [1,0,0,0,0,CLK,0] -> [1,0,1,0,0,0];
        [1,0,0,0,0,CLK,0] -> [0,1,1,0,0,0];
        [1,0,0,0,0,CLK,0] -> [1,1,1,0,0,0];
```

```
[1,0,0,0,0,CLK,0] -> [0,0,0,1,0,0];
[1,0,0,0,0,CLK,0] -> [1,0,0,1,0,0];
[1,0,0,0,0,CLK,0] -> [0,1,0,1,0,0];
[1,0,0,0,0,CLK,0] -> [1,1,0,1,0,0];
[1,0,0,0,0,CLK,0] -> [0,0,1,1,0,0];
[1,0,0,0,0,CLK,0] -> [1,0,1,1,0,0];
[1,0,0,0,0,CLK,0] -> [0,1,1,1,0,0];
[1,0,0,0,0,CLK,0] -> [1,1,1,1,0,0];

[1,0,0,0,0,CLK,0] -> [0,0,0,0,1,0];
[1,0,0,0,0,CLK,0] -> [1,0,0,0,1,0];
[1,0,0,0,0,CLK,0] -> [0,1,0,0,1,0];
[1,0,0,0,0,CLK,0] -> [1,1,0,0,1,0];
[1,0,0,0,0,CLK,0] -> [0,0,1,0,1,0];
[1,0,0,0,0,CLK,0] -> [1,0,1,0,1,0];
[1,0,0,0,0,CLK,0] -> [0,1,1,0,1,0];
[1,0,0,0,0,CLK,0] -> [1,1,1,0,1,0];

[1,0,0,0,0,CLK,0] -> [0,0,0,1,1,0];
[1,0,0,0,0,CLK,0] -> [1,0,0,1,1,0];
[1,0,0,0,0,CLK,0] -> [0,1,0,1,1,0];
[1,0,0,0,0,CLK,0] -> [1,1,0,1,1,0];
[1,0,0,0,0,CLK,0] -> [0,0,1,1,1,0];
[1,0,0,0,0,CLK,0] -> [1,0,1,1,1,0];
[1,0,0,0,0,CLK,0] -> [0,1,1,1,1,0];
[1,0,0,0,0,CLK,0] -> [1,1,1,1,1,1];

[0,0,0,0,1,CLK,0] -> [0,0,0,0,0,0];
[1,0,0,0,1,CLK,0] -> [0,0,0,0,0,0];
[1,0,0,0,0,CLK,1] -> [0,0,0,0,0,0];
[1,0,0,0,0,CLK,1] -> [0,0,0,0,0,0];

END CYC
```

```
MODULE U38OUT  FLAG '-r0'
TITLE 'TIGER SCAN CONVERTER
OUTPUT DECODER U38 pal
7-17-91; REV 1 7/30/91 FIXED XTP0 AND RAMOE
Schofield  NWC  CHINA LAKE, CA.'

U38    device    'P16R6';

CLK50MHZ(H)    pin    1;
        STV0(L)        pin    2;
        STV1(L)        pin    3;
        STV2(L)        pin    4;
        STV3(L)        pin    5;
  "      XTP0(H)       pin    6;
        CNT31(L)       pin    7;
        MAXVALUE(L)    pin    8;
        DETGTRAM(H)    pin    9;

RAMOE(L)       pin    13;
        OLDADDROE(L)   pin    14;
        OLDDATAOE(L)   pin    15;
        OEONES(L)      pin    16;
        OLDXTP0(L)     pin    17;
        RAMWE(L)       pin    18;

FIFOEMPTY(L)   pin    12;
        XTP0(H)        pin    19;

CLK          =    .C.;

A = STV0(L);
    B = STV1(L);
    C = STV2(L);
    D = STV3(L);

ST1 = D & !C & !B & !A;
    ST2 = !D & C & B & A;
    ST3 = D & !C & !B & A;
    ST4 = D & !C & B & !A;
    ST5 = D & !C & B & A;
    ST6 = D & C & !B & !A;
    STX0 = !D & !C & B & !A;
    STWR0 = D & C & !B & A;
    STWR1 = D & C & B & !A;

STB0 = D & C & B & A;
    STB1 = !D & !C & B & A;
    STB2 = !D & C & !B & !A;
    STB3 = !D & C & !B & A;
    STB4 = !D & C & B & !A;
    STSYNC = !D & !C & !B & A;
    STIDLE = !D & !C & !B & !A;
```

```
        EQUATIONS
        "********U38***********
        RAMOE(L) := STB4  # ST6 & CNT31(L) & !FIFOEMPTY(L)
 5          # STX0 # ST5 # ST6 & !CNT31(L);

OLDADDROE(L) := ST1 & !MAXVALUE(L)
            # ST2 & !MAXVALUE(L)
            # ST6 & FIFOEMPTY(L) & CNT31(L) & !MAXVALUE(L)
10          # STWR0 & !MAXVALUE(L)
            # MAXVALUE(L);

OLDDATAOE(L) := ST1 & !OLDXTP0(L) & !MAXVALUE(L)
            # ST2 & !OLDXTP0(L) & !MAXVALUE(L)
15          # ST6 & FIFOEMPTY(L) & CNT31(L) & !OLDXTP0(L) & !MAXVALUE(L)
            # STWR0 & !OLDXTP0(L) & !MAXVALUE(L);

OEONES(L) := ST1 & OLDXTP0(L) & !MAXVALUE(L)
            # ST2 & OLDXTP0(L) & !MAXVALUE(L)
20          # ST6 & FIFOEMPTY(L) & CNT31(L) & OLDXTP0(L) & !MAXVALUE(L)
            # STWR0 & OLDXTP0(L) & !MAXVALUE(L);

OLDXTP0(L) := !OLDXTP0(L) & ST5 & XTP0(H)
            # OLDXTP0(L) & ST5 & XTP0(H)
25          # OLDXTP0(L) & !D
            # OLDXTP0(L) & C
            # OLDXTP0(L) & !B
            # OLDXTP0(L) & !A;

30      RAMWE(L) := ST1 & !MAXVALUE(L)
                # ST6 & FIFOEMPTY(L) & CNT31(L) & !MAXVALUE(L)
                # ST3 & DETGTRAM(H) & MAXVALUE(L);

"********U38***********
35      "RAMOE(L) := STB4 # ST6 & CNT31(L) & !FIFOEMPTY(L)
        "   # STX0 # ST5 # ST6 & !CNT31(L);

"OLDADDROE(L) := ST1 & !MAXVALUE(L)
        "   # ST2 & !MAXVALUE(L)
40      "   # ST6 & FIFOEMPTY(L) & CNT31(L) & !MAXVALUE(L)
        "   # STWR0 & !MAXVALUE(L)
        "   # MAXVALUE(L);

"OLDDATAOE(L) := ST1 & !OLDXTP0(L) & !MAXVALUE(L)
45      "   # ST2 & !OLDXTP0(L) & !MAXVALUE(L)
        "   # ST6 & FIFOEMPTY(L) & CNT31(L) & !OLDXTP0(L) & !MAXVALUE(L)
        "   # STWR0 & !OLDXTP0(L) & !MAXVALUE(L);

"OEONES(L) := ST1 & OLDXTP0(L) & !MAXVALUE(L)
50      "       # ST2 & OLDXTP0(L) & !MAXVALUE(L)
        "       # ST6 & FIFOEMPTY(L) & CNT31(L) & OLDXTP0(L) &
        !MAXVALUE(L)
        "       # STWR0 & OLDXTP0(L) & !MAXVALUE(L);

55      "OLDXTP0(L) := !OLDXTP0(L) & ST5 & XTP0(H) # OLDXTP0(L)
        "               & ST5 & XTP0(H)
        "           # OLDXTP0(L) & !ST5;
```

```
"RAMWE(L) := ST1 & !MAXVALUE(L)
"         # ST6 & FIFOEMPTY(L) & CNT31(L) & !MAXVALUE(L)
"         # ST3 & DETGTRAM(H) & MAXVALUE(L);
TEST_VECTORS ([ STV3(L), STV2(L), STV1(L), STV0(L),
    CNT31(L), MAXVALUE(L), CLK50MHZ(H),
    FIFOEMPTY(L), DETGTRAM(H), XTP0(H)] ->
   [RAMOE(L), OLDADDROE(L), OLDDATAOE(L), OEONES(L), OLDXTP0(L),
RAMWE(L)])

[0,0,0,0, 0,0,CLK, 0,0,0] -> [0,0,0,0,0,0];"IDLE
[0,0,0,1, 0,0,CLK, 0,0,0] -> [0,0,0,0,0,0];"SYNC
[1,1,1,1, 0,0,CLK, 0,0,0] -> [0,0,0,0,0,0];"B0
[0,0,1,1, 0,0,CLK, 0,0,0] -> [0,0,0,0,0,0];"B1
[0,1,0,0, 0,0,CLK, 0,0,0] -> [0,0,0,0,0,0];"B2
[0,1,0,1, 0,0,CLK, 0,0,0] -> [0,0,0,0,0,0];"B3
[0,1,1,0, 0,0,CLK, 0,0,0] -> [1,0,0,0,0,0];"B4

[1,0,0,0, 0,0,CLK, 0,0,0] -> [0,1,1,0,0,1];"1
[1,0,0,0, 0,1,CLK, 0,0,0] -> [0,1,0,0,0,0];"1
[0,1,1,1, 0,0,CLK, 0,0,0] -> [0,1,1,0,0,0];"2
[1,0,0,1, 0,1,CLK, 0,1,0] -> [0,1,0,0,0,1];"3
[1,0,1,0, 0,0,CLK, 0,0,0] -> [0,0,0,0,0,0];"4
[1,0,1,1, 0,0,CLK, 0,0,0] -> [1,0,0,0,0,0];"5
[1,1,0,0, 1,0,CLK, 1,0,0] -> [0,1,1,0,0,1];"6
[1,1,0,0, 0,0,CLK, 0,0,0] -> [1,0,0,0,0,0];"6

[0,0,1,0, 0,0,CLK, 0,0,0] -> [1,0,0,0,0,0];"X0

[1,1,0,1, 0,0,CLK, 0,0,0] -> [0,1,1,0,0,0];"WR0
[1,1,1,0, 0,0,CLK, 0,0,0] -> [0,0,0,0,0,0];"WR1

[1,0,1,1, 0,0,CLK, 0,0,1] -> [1,0,0,0,1,0];"5 ASS OLDXTP0

[0,0,0,0, 0,0,CLK, 0,0,0] -> [0,0,0,0,1,0];"IDLE
[0,0,0,1, 0,0,CLK, 0,0,0] -> [0,0,0,0,1,0];"SYNC
[1,1,1,1, 0,0,CLK, 0,0,0] -> [0,0,0,0,1,0];"B0
[0,0,1,1, 0,0,CLK, 0,0,0] -> [0,0,0,0,1,0];"B1
[0,1,0,0, 0,0,CLK, 0,0,0] -> [0,0,0,0,1,0];"B2
[0,1,0,1, 0,0,CLK, 0,0,0] -> [0,0,0,0,1,0];"B3
[0,1,1,0, 0,0,CLK, 0,0,0] -> [1,0,0,0,1,0];"B4

[1,0,0,0, 0,0,CLK, 0,0,0] -> [0,1,0,1,1,1];"1
[1,0,0,0, 0,1,CLK, 0,0,0] -> [0,1,0,0,1,0];"1
[0,1,1,1, 0,0,CLK, 0,0,0] -> [0,1,0,1,1,0];"2
[1,0,0,1, 0,1,CLK, 0,1,0] -> [0,1,0,0,1,1];"3
[1,0,1,0, 0,0,CLK, 0,0,0] -> [0,0,0,0,1,0];"4
[1,0,1,1, 0,0,CLK, 0,0,1] -> [1,0,0,0,1,0];"5
[1,1,0,0, 1,0,CLK, 1,0,0] -> [0,1,0,1,1,1];"6
[1,1,0,0, 0,0,CLK, 0,0,0] -> [1,0,0,0,1,0];"6

[0,0,1,0, 0,0,CLK, 0,0,0] -> [1,0,0,0,1,0];"X0

[1,1,0,1, 0,0,CLK, 0,0,0] -> [0,1,0,1,1,0];"WR0
[1,1,1,0, 0,0,CLK, 0,0,0] -> [0,0,0,0,1,0];"WR1
```

END U38OUT

```
MODULE U39OUT   FLAG '-r0'
TITLE 'TIGER SCAN CONVERTER
OUTPUT DECODER U39 pal
7-19-91; REV 1 7/30/91
Schofield   NWC   CHINA LAKE, CA.'

U39     device      'P16R6';

CLK50MHZ(H)     pin     1;
        STV0(L)         pin     2;
        STV1(L)         pin     3;
        STV2(L)         pin     4;
        STV3(L)         pin     5;
        SYNC(L)         pin     6;
        CNT31(L)        pin     7;
        MAXVALUE(L)     pin     8;
        RESET(L)        pin     9;

LTCHWRDATA(H)   pin     13;
        PCLK(H)         pin     14;
        XCLK(H)         pin     15;
        NEWADDROE(L)    pin     16;

LTCHOLDATA(H)   pin     18;

FIFOEMPTY(L)    pin     12;

CLK         =   .C.;

A = STV0(L);
B = STV1(L);
C = STV2(L);
D = STV3(L);

ST1 = D & !C & !B & !A;
ST2 = !D & C & B & A;
ST3 = D & !C & !B & A;
ST4 = D & !C & B & !A;
ST5 = D & !C & B & A;
ST6 = D & C & !B & !A;
STX0 = !D & !C & B & !A;
STWR0 = D & C & !B & A;
STWR1 = D & C & B & !A;

STB0 = D & C & B & A;
STB1 = !D & !C & B & A;
STB2 = !D & C & !B & !A;
STB3 = !D & C & !B & A;
STB4 = !D & C & B & !A;
STSYNC = !D & !C & !B & A;
STIDLE = !D & !C & !B & !A;

EQUATIONS
"********U39***********

!LTCHWRDATA(H) := A # B # C # !D;
```

```
            !PCLK(H) := MAXVALUE(L) # B # C # !D;

!XCLK(H) := MAXVALUE(L) # A # B # C # !D;

NEWADDROE(L) := STB3 & !MAXVALUE(L)
                      # A & !C & D & !MAXVALUE(L)
                      # ST4 & !MAXVALUE(L)
                      # !A & B & !D & !MAXVALUE(L)
                      # ST6 & !CNT31(L) & !MAXVALUE(L)
                      # ST6 & !FIFOEMPTY(L) & CNT31(L) & !MAXVALUE(L);

!LTCHOLDATA(H) := A # !B # C # !D;

"********U39***********

"LTCHWRDATA(H) := ST1;

"PCLK(H) := ST1 & !MAXVALUE # ST3 & !MAXVALUE;

"XCLK(H) := ST1 & !MAXVALUE;

"NEWADDROE(L) := STB3 & !MAXVALUE # STB4 & !MAXVALUE
            "             # ST3 & !MAXVALUE # ST4 & !MAXVALUE
            "             # ST5 & !MAXVALUE
            "             # ST6 & !CNT31 & !MAXVALUE
            "             # ST6 & !FIFOEMPTY & CNT31 & !MAXVALUE
            "             # STX0 & !MAXVALUE;

"LTCHOLDAT(H) := ST4; NOT used for MAXVALUE mode
            "                     BUT DONT CARE TEST_VECTORS ([ STV3(L), STV2(L), STV1(L), STV0(L),
             CNT31(L), MAXVALUE(L), RESET(L), CLK50MHZ(H),
             FIFOEMPTY(L)]->
               [LTCHWRDATA(H), PCLK(H), XCLK(H), NEWADDROE(L), LTCHOLDATA(H)
            ])

[0,0,0,0, 0,0,0,CLK,0] -> [0,0,0,0,0];"IDLE
            [0,0,0,1, 0,0,0,CLK,0] -> [0,0,0,0,0];"SYNC
            [1,1,1,1, 0,0,0,CLK,0] -> [0,0,0,0,0];"B0
            [0,0,1,1, 0,0,0,CLK,0] -> [0,0,0,0,0];"B1
            [0,1,0,0, 0,0,0,CLK,0] -> [0,0,0,0,0];"B2
            [0,1,0,1, 0,0,0,CLK,0] -> [0,0,0,1,0];"B3
            [0,1,1,0, 0,0,0,CLK,0] -> [0,0,0,1,0];"B4

[1,0,0,0, 0,1,0,CLK,0] -> [1,0,0,0,0];"1
            [1,0,0,0, 0,0,0,CLK,0] -> [1,1,1,0,0];"1
            [0,1,1,1, 0,0,0,CLK,0] -> [0,0,0,0,0];"2
            [1,0,0,1, 0,0,0,CLK,0] -> [0,1,0,1,0];"3
            [1,0,1,0, 0,0,0,CLK,0] -> [0,0,0,1,1];"4
            [1,0,1,1, 0,0,0,CLK,0] -> [0,0,0,1,0];"5
            [1,1,0,0, 0,0,0,CLK,0] -> [0,0,0,1,0];"6
            [1,1,0,0, 1,0,0,CLK,0] -> [0,0,0,1,0];"6
            [1,1,0,0, 1,0,0,CLK,1] -> [0,0,0,0,0];"6

[0,0,1,0, 0,0,0,CLK,0] -> [0,0,0,1,0];"X0
```

```
[1,1,0,1, 0,0,0,CLK,0] -> [0,0,0,0,0];"WR0
[1,1,1,0, 0,0,0,CLK,0] -> [0,0,0,0,0];"WR1

END U39OUT
```

```
MODULE U40OUT    FLAG '-r0'
TITLE 'TIGER SCAN CONVERTER
OUTPUT DECODER U40 pal
7-17-91, REV 1    7/26/91
Schofield   NWC  CHINA LAKE, CA.'

U40      device      'P16R6';

CLK50MHZ(H)      pin      1;
        STV0(L)          pin      2;
        STV1(L)          pin      3;
        STV2(L)          pin      4;
        STV3(L)          pin      5;
        SYNC(L)          pin      6;
        CNT31(L)         pin      7;
        MAXVALUE(L)      pin      8;
        RESET(H)         pin      9;

MULTOE(L)        pin     13;
        LTCHOLDADD(H)    pin     14;
        INCPIXADD(H)     pin     15;
"       XTPZERO(L)       pin     16;
        YCLK(H)          pin     17;
        PRELOAD(H)       pin     18;

RESET(L)         pin     19;

CLK         =    .C.;

A = STV0(L);
B = STV1(L);
C = STV2(L);
D = STV3(L);

ST1 = D & !C & !B & !A;
ST2 = !D & C & B & A;
ST3 = D & !C & !B & A;
ST4 = D & !C & B & !A;
ST5 = D & !C & B & A;
ST6 = D & C & !B & !A;
STX0 = !D & !C & B & !A;
STWR0 = D & C & !B & A;
STWR1 = D & C & B & !A;

STB0 = D & C & B & A;
STB1 = !D & !C & B & A;
STB2 = !D & C & !B & !A;
STB3 = !D & C & !B & A;
STB4 = !D & C & B & !A;
STSYNC = !D & !C & !B & A;
STIDLE = !D & !C & !B & !A;

EQUATIONS

RESET(L) = RESET(H);
```

```
MULTOE(L) := ST3 & !MAXVALUE(L) # ST4 & !MAXVALUE(L);

!LTCHOLDADD(H) := C # !D # B
    # !A & !MAXVALUE(L)
    # A & MAXVALUE(L);

!INCPIXADD(H) := C # !D # B
    # !A & !MAXVALUE(L)
    # A & MAXVALUE(L);

"XTPZERO(L) := STB4 & !MAXVALUE(L)
"          # ST6 & !CNT31(L) & !MAXVALUE(L)
"          # STX0 & !MAXVALUE(L);

!YCLK(H) := A
    # !B
    # D
    # MAXVALUE(L);

!PRELOAD(H) := MAXVALUE(L)
    # !A & !B & C & D & CNT31(L)
    # A
    # B & D
    # !B & !D;

"MULTOE(L) =: ST3 & !MAXVALUE # ST4 & !MAXVALUE;

"LTCHOLDADD(H) =: ST3 & !MAXVALUE # ST1 & MAXVALUE;

"INCPIXADD(H) =: ST3 & !MAXVALUE # ST1 & MAXVALUE;

"XTPZERO(L) =: STB4 & !MAXVALUE # ST6 & !CNT31 & !MAXVALUE
"     # STX0 & !MAXVALUE; replaced by pull down resistors

"YCLK(H) =: STB4 & !MAXVALUE # STX0 & !MAXVALUE;

"PRELOAD(H) =: ST6 & !CNT31 & !MAXVALUE # STX0 & !MAXVALUE
"         # ST1 & !MAXVALUE # STB4 & SYNC(L) & !MAXVALUE(L)
"         # STB4 & !MAXVALUE;

TEST_VECTORS ([ STV3(L), STV2(L), STV1(L), STV0(L), CNT31(L),
MAXVALUE(L), RESET(H), CLK50MHZ(H)] ->
    [MULTOE(L), LTCHOLDADD(H), INCPIXADD(H), YCLK(H), PRELOAD(H)])

[0,0,0,0, 0,0,0,CLK] -> [0,0,0,0,0];"IDLE
[0,0,0,1, 0,0,0,CLK] -> [0,0,0,0,0];"SYNC
[1,1,1,1, 0,0,0,CLK] -> [0,0,0,0,0];"B0
[0,0,1,1, 0,0,0,CLK] -> [0,0,0,0,0];"B1
[0,1,0,0, 0,0,0,CLK] -> [0,0,0,0,0];"B2
[0,1,0,1, 0,0,0,CLK] -> [0,0,0,0,0];"B3
[0,1,1,0, 0,0,0,CLK] -> [0,0,0,1,1];"B4

[1,0,0,0, 0,1,0,CLK] -> [0,1,1,0,0];"1
```

```
[1,0,0,0, 0,0,0,CLK] -> [0,0,0,0,1];"1
[0,1,1,1, 0,0,0,CLK] -> [0,0,0,0,0];"2
[1,0,0,1, 0,0,0,CLK] -> [1,1,1,0,0];"3
[1,0,1,0, 0,0,0,CLK] -> [1,0,0,0,0];"4
[1,0,1,1, 0,0,0,CLK] -> [0,0,0,0,0];"5
[1,1,0,0, 1,0,0,CLK] -> [0,0,0,0,0];"6
[1,1,0,0, 0,0,0,CLK] -> [0,0,0,0,1];"6

[0,0,1,0, 0,0,0,CLK] -> [0,0,0,1,1];"X0

[1,1,0,1, 0,0,0,CLK] -> [0,0,0,0,0];"WR0
[1,1,1,0, 0,0,0,CLK] -> [0,0,0,0,0];"WR1

TEST_VECTORS ([ RESET(H)] -> [ RESET(L)])

[0] -> [0];
[1] -> [1];

END U40OUT
```

```
MODULE U41OUT  FLAG '-r0'
TITLE 'TIGER SCAN CONVERTER
OUTPUT DECODER U41 pal
7-17-91; REV 1  7/30/91; REV 2 9-13-91 (change BUFDIR to (L)
Schofield  NWC  CHINA LAKE, CA.'

U41     device      'P16R6';

CLK50MHZ(H)     pin     1;
        STV0(L)         pin     2;
        STV1(L)         pin     3;
        STV2(L)         pin     4;
        STV3(L)         pin     5;
        SYNC(L)         pin     6;
        CNT31(L)        pin     7;
        MAXVALUE(L)     pin     8;
        RESET(L)        pin     9;

FIFOEMPTY(L)    pin     12;

ADPBUFDIR(L)    pin     13;

ADPBUFOE(L)     pin     15;
        BDPBUFOE(L)     pin     16;
        SLCTBLKA(L)     pin     17;

CLK             =       .C.;

A = STV0(L);
B = STV1(L);
C = STV2(L);
D = STV3(L);

ST1 = D & !C & !B & !A;
ST2 = !D & C & B & A;
ST3 = D & !C & !B & A;
ST4 = D & !C & B & !A;
ST5 = D & !C & B & A;
ST6 = D & C & !B & !A;
STX0 = !D & !C & B & !A;
STWR0 = D & C & !B & A;
STWR1 = D & C & B & !A;

STB0 = D & C & B & A;
STB1 = !D & !C & B & A;
STB2 = !D & C & !B & !A;
STB3 = !D & C & !B & A;
STB4 = !D & C & B & !A;
STSYNC = !D & !C & !B & A;
STIDLE = !D & !C & !B & !A;

EQUATIONS
"********U41**********
```

```
ADPBUFDIR(L) := ST5   # ST6 & !CNT31(L)
            # ST6 & CNT31(L) & !FIFOEMPTY(L)
            # STX0;

ADPBUFOE(L) := STB4 & SLCTBLKA(L)
    # ST1 & !MAXVALUE(L) & SLCTBLKA(L)
    # ST2 & SLCTBLKA(L)
    # ST3 & SLCTBLKA(L)
    # ST4 & SLCTBLKA(L)
    # ST6 & !CNT31(L) & SLCTBLKA(L)
    # ST6 & FIFOEMPTY(L) & SLCTBLKA(L)
    # STX0 & SLCTBLKA(L);

BDPBUFOE(L) := STB4 & !SLCTBLKA(L)
    # ST1 & !MAXVALUE(L) & !SLCTBLKA(L)
    # ST2 & !SLCTBLKA(L)
    # ST3 & !SLCTBLKA(L)
    # ST4 & !SLCTBLKA(L)
    # ST6 & !CNT31(L) & !SLCTBLKA(L)
    # ST6 & FIFOEMPTY(L) & !SLCTBLKA(L)
    # STX0 & !SLCTBLKA(L);

SLCTBLKA(L) := SLCTBLKA(L) & A       "NOT STWR1
    # SLCTBLKA(L) & !B               "NOT STWR1
    # SLCTBLKA(L) & !C               "NOT STWR1
    # SLCTBLKA(L) & !D               "NOT STWR1
    # !SLCTBLKA(L) & D & C & B & !A;" STWR1

"********U41**********

"9/13/91*** The assertion of ADPBUFDIR(H) should be (L)
"           so the equation should be the same but it does
"           not need to be demorganed. Ron Schofield
"ADPBUFDIR(L) := (ST5   # ST6 & !CNT31
"             # ST6 & CNT31 & !FIFOEMPTY
"             # X0) & SLCTBLKA(L);
"BDPBUFDIR(L)  SEE ABOVE EQUATION;
"A AND B BUF DIR USE THE SAME SIGNAL SINCE BUF OE
" DETERMINES WHICH IS ACTIVE AND THE OTHER IS A DONT CARE "ADPBUFOE(L) := (STB4 # ST1 & !MAXVALUE # ST2 # ST3
"            # ST4 # ST6 & !CNT31
"            # ST6 & FIFOEMPTY # STX0) & SLCTBLKA(L);

"BDPBUFOE(L) := (STB4 # ST1 & !MAXVALUE # ST2 # ST3
"            # ST4 # ST6 & !CNT31
"            # ST6 & FIFOEMPTY # STX0) & !SLCTBLKA(L);

"SLCTBLKA(L) := SLCTBLKA & !STWR1 # !SLCTBLKA & STWR1;

TEST_VECTORS ([ STV3(L), STV2(L), STV1(L), STV0(L), CNT31(L),
MAXVALUE(L), RESET(L), CLK50MHZ(H),
 FIFOEMPTY(L)]  ->
  [ ADPBUFDIR(L), ADPBUFOE(L), BDPBUFOE(L), SLCTBLKA(L) ])

[0,0,0,0, 0,0,0,CLK,0] -> [0,0,0,0];"IDLE
[0,0,0,1, 0,0,0,CLK,0] -> [0,0,0,0];"SYNC
```

```
     [1,1,1,1, 0,0,0,CLK,0] -> [0,0,0,0];"B0
     [0,0,1,1, 0,0,0,CLK,0] -> [0,0,0,0];"B1
     [0,1,0,0, 0,0,0,CLK,0] -> [0,0,0,0];"B2
     [0,1,0,1, 0,0,0,CLK,0] -> [0,0,0,0];"B3
     [0,1,1,0, 0,0,0,CLK,0] -> [0,0,1,0];"B4

[1,0,0,0, 0,0,0,CLK,0] -> [0,0,1,0];"1
     [1,0,0,0, 0,1,0,CLK,0] -> [0,0,0,0];"1
     [0,1,1,1, 0,0,0,CLK,0] -> [0,0,1,0];"2
     [1,0,0,1, 0,0,0,CLK,0] -> [0,0,1,0];"3
     [1,0,1,0, 0,0,0,CLK,0] -> [0,0,1,0];"4
     [1,0,1,1, 0,0,0,CLK,0] -> [1,0,0,0];"5
     [1,1,0,0, 1,0,0,CLK,0] -> [1,0,0,0];"6
     [1,1,0,0, 0,0,0,CLK,0] -> [0,0,1,0];"6
     [1,1,0,0, 1,0,0,CLK,1] -> [0,0,1,0];"6

[0,0,1,0, 0,0,0,CLK,0] -> [1,0,1,0];"X0

[1,1,0,1, 0,0,0,CLK,0] -> [0,0,0,0];"WR0
     [1,1,1,0, 0,0,0,CLK,0] -> [0,0,0,1];"WR1

[0,0,0,0, 0,0,0,CLK,0] -> [0,0,0,1];"IDLE
     [0,0,0,1, 0,0,0,CLK,0] -> [0,0,0,1];"SYNC
     [1,1,1,1, 0,0,0,CLK,0] -> [0,0,0,1];"B0
     [0,0,1,1, 0,0,0,CLK,0] -> [0,0,0,1];"B1
     [0,1,0,0, 0,0,0,CLK,0] -> [0,0,0,1];"B2
     [0,1,0,1, 0,0,0,CLK,0] -> [0,0,0,1];"B3
     [0,1,1,0, 0,0,0,CLK,0] -> [0,1,0,1];"B4

[1,0,0,0, 0,1,0,CLK,0] -> [0,0,0,1];"1
     [1,0,0,0, 0,0,0,CLK,0] -> [0,1,0,1];"1
     [0,1,1,1, 0,0,0,CLK,0] -> [0,1,0,1];"2
     [1,0,0,1, 0,0,0,CLK,0] -> [0,1,0,1];"3
     [1,0,1,0, 0,0,0,CLK,0] -> [0,1,0,1];"4
     [1,0,1,1, 0,0,0,CLK,0] -> [1,0,0,1];"5
     [1,1,0,0, 1,0,0,CLK,0] -> [1,0,0,1];"6
     [1,1,0,0, 0,0,0,CLK,0] -> [1,1,0,1];"6
     [1,1,0,0, 1,0,0,CLK,1] -> [0,1,0,1];"6

[0,0,1,0, 0,0,0,CLK,0] -> [1,1,0,1];"X0

[1,1,0,1, 0,0,0,CLK,0] -> [0,0,0,1];"WR0
     [1,1,1,0, 0,0,0,CLK,0] -> [0,0,0,0];"WR1

END U41OUT
```

```
MODULE U42OUT   FLAG '-r0'
TITLE 'TIGER SCAN CONVERTER
OUTPUT DECODER U42 pal
7-17-91; REV 1 7/30/91
Schofield   NWC  CHINA LAKE, CA.'

U42    device      'P16R6';

CLK50MHZ(H)    pin       1;
        STV0(L)        pin       2;
        STV1(L)        pin       3;
        STV2(L)        pin       4;
        STV3(L)        pin       5;
        SYNC(L)        pin       6;
        CNT31(L)       pin       7;
        MAXVALUE(L)    pin       8;
        RESET(L)       pin       9;

CLRPIXADD(L)      pin        13;
        FIFORD(L)         pin        14;
        FIFOOE(L)         pin        15;
        MAXDETOE(L)       pin        16;

FIFOEMPTY(L)      pin        19;

CLK           =    .C.;

A = STV0(L);
B = STV1(L);
C = STV2(L);
D = STV3(L);

ST1 = D & !C & !B & !A;
ST2 = !D & C & B & A;
ST3 = D & !C & !B & A;
ST4 = D & !C & B & !A;
ST5 = D & !C & B & A;
ST6 = D & C & !B & !A;
STX0 = !D & !C & B & !A;
STWR0 = D & C & !B & A;
STWR1 = D & C & B & !A;

STB0 = D & C & B & A;
STB1 = !D & !C & B & A;
STB2 = !D & C & !B & !A;
STB3 = !D & C & !B & A;
STB4 = !D & C & B & !A;
STSYNC = !D & !C & !B & A;
STIDLE = !D & !C & !B & !A;

EQUATIONS

"********U42***********

CLRPIXADD(L) := STB0 & !RESET(L);
```

```
FIFORD(L) := STB3 & SYNC(L)  & !RESET(L)
           # STB4 & MAXVALUE(L) & !RESET(L)
           # ST4 & !MAXVALUE(L) & !RESET(L)
           # STX0 & MAXVALUE(L) & !RESET(L)
           # A & !C & !RESET(L) # A & B & !RESET(L)
           # !A & !B & D & !RESET(L) # !A & !B & C & !RESET(L);

FIFOOE(L) := STB3 & SYNC(L) & !MAXVALUE(L) & !RESET(L)
           # ST6 & CNT31(L) & !FIFOEMPTY(L)
                & !MAXVALUE(L) & !RESET(L);

MAXDETOE(L) := ST2 & MAXVALUE(L) & !RESET(L)
             # ST3 & MAXVALUE(L) & !RESET(L)
             # ST4 & MAXVALUE(L) & !RESET(L);

" EQUATIONS BEFORE CONVERSION

"CLRPIXADD(L) := STB0

"FIFORD(L) := STSYNC # STB0 # STB1 # STB2 # STB3 & SYNC
"           # STB4 & MAXVALUE # ST1 # ST2 # ST3
"           # ST4 & !MAXVALUE # ST5 # ST6 # STX0 & !MAXVALUE;

"FIFOOE(L) := STB3 & SYNC & !MAXVALUE
"          # ST6 & CNT31 & !FIFOEMPTY & !MAXVALUE;

"MAXDETOE(L) := ST2 & MAXVALUE # ST3 & MAXVALUE
"             # ST4 & MAXVALUE;

TEST_VECTORS ([ STV3(L), STV2(L), STV1(L), STV0(L), SYNC(L),
CNT31(L), MAXVALUE(L), RESET(L), CLK50MHZ(H), FIFOEMPTY(L)] ->
   [CLRPIXADD(L), FIFORD(L), FIFOOE(L), MAXDETOE(L)])

[0,0,0,0, 0, 0,0,0,CLK,0] -> [0,0,0,0];"IDLE
[0,0,0,1, 0, 0,0,0,CLK,0] -> [0,1,0,0];"SYNC
[1,1,1,1, 0, 0,0,0,CLK,0] -> [1,1,0,0];"B0
[0,0,1,1, 0, 0,0,0,CLK,0] -> [0,1,0,0];"B1
[0,1,0,0, 0, 0,0,0,CLK,0] -> [0,1,0,0];"B2
[0,1,0,1, 1, 0,1,0,CLK,0] -> [0,1,0,0];"B3
[0,1,0,1, 1, 0,0,0,CLK,0] -> [0,1,1,0];"B3
[0,1,0,1, 0, 0,0,0,CLK,0] -> [0,0,0,0];"B3
[0,1,1,0, 0, 0,0,0,CLK,0] -> [0,0,0,0];"B4
[0,1,1,0, 0, 0,1,0,CLK,0] -> [0,1,0,0];"B4

[1,0,0,0, 0, 0,1,0,CLK,0] -> [0,1,0,0];"1
[1,0,0,0, 0, 0,0,0,CLK,0] -> [0,1,0,0];"1
[0,1,1,1, 0, 0,1,0,CLK,0] -> [0,1,0,1];"2
[1,0,0,1, 0, 0,1,0,CLK,0] -> [0,1,0,1];"3
[1,0,1,0, 0, 0,0,0,CLK,0] -> [0,1,0,0];"4
[1,0,1,0, 0, 0,1,0,CLK,0] -> [0,0,0,1];"4
[1,0,1,1, 0, 0,0,0,CLK,0] -> [0,1,0,0];"5
[1,1,0,0, 1, 1,0,0,CLK,0] -> [0,1,1,0];"6
[1,1,0,0, 0, 0,0,0,CLK,1] -> [0,1,0,0];"6
```

```
        [0,0,1,0, 0, 0,1,0,CLK,0] -> [0,1,0,0];"X0
        [0,0,1,0, 0, 0,0,0,CLK,0] -> [0,0,0,0];"X0

5       [1,1,0,1, 0, 0,0,0,CLK,0] -> [0,0,0,0];"WR0
        [1,1,1,0, 0, 0,0,0,CLK,0] -> [0,0,0,0];"WR1

END U42OUT
```

What is claimed is:

1. A control signal generating circuit comprising:

state machine means for receiving a system clock signal, said state machine means, responsive to said system clock signal, generating a plurality of state variable signals;

a plurality of decoding means coupled to said state machine means, each of said decoding means receiving said plurality of state variable signals, each of said decoding means decoding said plurality of state variable signals to provide a group of timing and control signals;

first delay means coupled to three of said plurality of decoding means, said first delay means receiving and then delaying for a first predetermined time period some of said group of timing and control signals from each of said three decoding means coupled to said first delay means; and second delay means coupled to two of said plurality of decoding means, said second delay means receiving and then delaying for a second predetermined time period at least one of said timing and control signals from each of said two decoding means coupled to said second delay means.

2. The control signal generating circuit of claim 1 wherein said first delay means comprises first, second and third five nanosecond delay lines.

3. The control signal generating circuit of claim 1 wherein said second delay means comprises a fifteen nanosecond delay line.

4. The control signal generating circuit of claim 1 wherein said state machine means and each of said decoding means comprises a programmable array logic circuit.

5. A control signal generating circuit comprising:

a clock signal generating circuit for generating a system clock signal having a predetermined frequency;

a state machine coupled to said clock signal generating circuit to receive said system clock signal, said state machine receiving an externally generated FIFO empty signal, said state machine responsive to said system clock signal and said externally generated FIFO empty signal, generating four state variable signals whenever said externally generated FIFO empty signal is not asserted;

said state machine remaining in an idle state whenever said externally generated FIFO empty signal is asserted;

at least three decoder circuits coupled to said state machine to receive said four state variable signals, said at least three decoder circuits receiving said externally generated FIFO empty signal;

each of said at least three decoder circuits decoding said four state variable signals and said externally generated FIFO empty signal to provide a set of control and timing signals;

a first delay line coupled to said at least three decoder circuits, said first delay line receiving and then delaying for a first predetermined time period some of said set of timing and control signals from each of said at least three decoder circuits coupled to said first delay line; and a second delay line coupled to a pair decoder circuits of said at least three decoder circuits;

said second delay line receiving and then delaying for a second predetermined time period at least one of said set of timing and control signals from each of said pair of decoder circuits coupled to said second delay line.

6. The control signal generating circuit of claim 5 wherein the predetermined frequency of said system clock signal is fifty megahertz.

7. The control signal generating circuit of claim 5 wherein said first delay line comprises a first, second and third five nanosecond delay line circuit.

8. The control signal generating circuit of claim 5 wherein said second delay line comprises a fifteen nanosecond delay line.

9. The control signal generating circuit of claim 5 wherein said state machine and each of said at least three decoder circuits comprises a programmable array logic circuit.

10. A control signal generating circuit comprising:

a clock signal generating circuit for generating a system clock signal having a predetermined frequency;

a state machine coupled to said clock signal generating circuit to receive said system clock signal, said state machine receiving an externally generated FIFO empty signal, said state machine responsive to said system clock signal and said externally generated FIFO empty signal, generating four state variable signals, an increment cycle counter signal and a clear cycle counter signal whenever said externally generated FIFO empty signal is not asserted;

said state machine remaining in an idle state whenever said externally generated FIFO empty signal is asserted;

a cycle counter coupled to said state machine to receive said increment cycle counter signal and said clear cycle counter signal;

said increment cycle counter incrementing said cycle counter until said cycle counter counts to a predetermined binary number, said cycle counter generating a count thirty one signal at said predetermined binary count, said clear cycle counter signal clearing said cycle counter;

at least three decoder circuits coupled to said state machine and said cycle counter to receive said four state variable signals and said count thirty one signal, said at least three decoder circuits receiving said externally generated FIFO empty signal;

each of said at least three decoder circuits decoding said four state variable signals, said count thirty one signal and said externally generated FIFO empty signal to provide a set of control and timing signals;

a first delay line coupled to said at least three decoder circuits, said first delay line receiving and then delaying for a first predetermined time period some of said set of timing and control signals from each of said at least three decoder circuits coupled to said first delay line; and a second delay line coupled to a pair decoder circuits of said at least three decoder circuits;

said second delay line receiving and then delaying for a second predetermined time period at least one of said set of timing and control signals from each of said pair of decoder circuits coupled to said second delay line.

11. The control signal generating circuit of claim 10 wherein the predetermined frequency of said system clock signal is fifty megahertz.

12. The control signal generating circuit of claim 10 wherein said first delay line comprises first, second and third five nanosecond delay line circuits.

13. The control signal generating circuit of claim 10 wherein said second delay line comprises a fifteen nanosecond delay line.

14. The control signal generating circuit of claim 10 wherein said state machine, said cycle counter and each of said at least three decoder circuits comprises a programmable array logic circuit.

15. A control signal generating circuit comprising:

a clock signal generating circuit for generating a system clock signal having a predetermined frequency;

a state machine coupled to said clock signal generating circuit to receive said system clock signal, said state machine receiving an externally generated FIFO empty signal, said state machine responsive to said system clock signal and said externally generated FIFO empty signal, generating four state variable signals, an increment cycle counter signal and a clear cycle counter signal whenever said externally generated FIFO empty signal is not asserted;

said state machine remaining in an idle state whenever said externally generated FIFO empty signal is asserted;

a cycle counter coupled to said state machine to receive said increment cycle counter signal and said clear cycle counter signal;

said increment cycle counter incrementing said cycle counter until said cycle counter counts to a predetermined binary number, said cycle counter generating a count thirty one signal at said predetermined binary count, said clear cycle counter signal clearing said cycle counter;

first, second and third decoder circuits coupled to said state machine and said cycle counter to receive said four state variable signals and said count thirty one signal, said at least three decoder circuits receiving said externally generated FIFO empty signal;

each of said first, second and third decoder circuits decoding said four state variable signals, said count thirty one signal and said externally generated FIFO empty signal to provide a set of control and timing signals;

a first delay line coupled to said first, second and third decoder circuits, said first delay line receiving and then delaying for a first predetermined time period some of said set of timing and control signals from each of said first, second and third decoder circuits;

a second delay line coupled to said first and second decoder circuits;

said second delay line receiving and then delaying for a second predetermined time period at least one of said set of timing and control signals from each of said second and third decoder circuits;

a fourth decoder circuit coupled to said state machine and said cycle counter to receive said four state variable signals and said count thirty one signal, said fourth decoder decoding said four state variable signals and said count thirty one signal to provide a first group of at least four control signal and at least one timing signal; and a fifth decoder circuit coupled to said state machine and said cycle counter to receive said four state variable signals and said count thirty one signal, said fifth decoder circuit receiving said externally generated FIFO empty signal;

said fifth decoder circuit decoding said four state variable signals, said count thirty one signal and said externally generated FIFO empty signal to provide a second group of at least four control signals.

16. The control signal generating circuit of claim 15 further comprising a reset signal generating circuit for generating a reset signal, said reset signal generating circuit being coupled to said fourth decoder circuit to provide said reset signal to said fourth decoder circuit, said fourth decoder circuit inverting said reset signal to provide an inverted reset signal.

17. The control signal generating circuit of claim 16 wherein said reset signal generating circuit comprises:

a voltage source;

a diode having a cathode connected to said voltage source and an anode;

a normally open switch having a first terminal connected to the anode of said diode and a second terminal connected to ground;

a first resistor having a first terminal connected to said voltage source and a second terminal connected to the anode of said diode;

a capacitor having a negative terminal connected to ground and a positive terminal connected to the anode of said diode;

a operational amplifier having a negative input connected to the anode of said diode, a positive input and an output connected to said fourth decoder circuit;

a second resistor having a first terminal connected to the output of said operational amplifier and a second terminal connected to the positive input of said operational amplifier; and a third resistor having a first terminal connected to ground and a second terminal connected to the positive input of said operational amplifier.

18. The control signal generating circuit of claim 15 wherein said first delay line comprises first, second and third five nanosecond delay line circuits.

19. The control signal generating circuit of claim 15 wherein said second delay line comprises a fifteen nanosecond delay line.

20. The control signal generating circuit of claim 15 wherein said state machine, said cycle counter and each of said first, second, third, fourth and fifth decoder circuits comprises a programmable array logic circuit.

* * * * *